(12) United States Patent
Zhao et al.

(10) Patent No.: US 12,379,830 B2
(45) Date of Patent: Aug. 5, 2025

(54) ELECTRONIC APPARATUS

(71) Applicant: Lenovo (Beijing) Limited, Beijing (CN)

(72) Inventors: Wanwan Zhao, Beijing (CN); Guannan Zhang, Beijing (CN); Yu Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 255 days.

(21) Appl. No.: 18/166,153

(22) Filed: Feb. 8, 2023

(65) Prior Publication Data

US 2023/0251770 A1 Aug. 10, 2023

(30) Foreign Application Priority Data

Feb. 8, 2022 (CN) .................. 202210118194.X (51) Int. Cl.
| | |
|---|---|
| *G06F 3/04842* | (2022.01) |
| *G06F 3/01* | (2006.01) |
| *G06T 7/593* | (2017.01) |
| *G06T 7/73* | (2017.01) |
| *G06T 15/06* | (2011.01) |

(52) U.S. Cl.
CPC .......... *G06F 3/04842* (2013.01); *G06F 3/011* (2013.01); *G06T 7/593* (2017.01); *G06T 7/74* (2017.01); *G06T 15/06* (2013.01); *G06T 2200/24* (2013.01); *G06T 2210/21* (2013.01)

(58) Field of Classification Search
CPC .. G06F 3/04842; G06F 3/011; G06F 3/04815; G06T 7/593; G06T 7/74; G06T 15/06; G06T 2200/24; G06T 2210/21; G06T 15/20; A63F 13/52
See application file for complete search history.

(56) References Cited

U.S. PATENT DOCUMENTS

| | | | |
|---|---|---|---|
| 2011/0235899 A1* | 9/2011 | Tanaka | H04N 13/10 348/46 |
| 2013/0093860 A1* | 4/2013 | Shimotani | G06F 3/0416 348/51 |
| 2017/0003750 A1* | 1/2017 | Li | G06F 3/017 |
| 2018/0275781 A1* | 9/2018 | Gribetz | G06F 3/011 |
| 2020/0043242 A1* | 2/2020 | Hu | G06F 3/0346 |
| 2020/0066050 A1* | 2/2020 | Ha | G06T 19/006 |

* cited by examiner

*Primary Examiner* — Jitesh Patel
(74) *Attorney, Agent, or Firm* — ANOVA LAW GROUP, PLLC (57) ABSTRACT

An object determination method includes outputting a virtual scene image of a virtual scene. The virtual scene image includes a stereoscopic virtual image of at least one virtual object in the virtual scene. The method further includes, based on a selection operation on the virtual object in the virtual scene image, determining an operation point coordinate of the selection operation in a display area. The display area is configured to display the virtual scene image. The method further includes determining a reference coordinate position in the virtual scene, determining a spatial coordinate of the operation point coordinate of the selection operation mapped into the virtual scene, and determining at least one candidate virtual object for a user to select from the virtual scene in connection with the reference coordinate position and the spatial coordinate.

15 Claims, 5 Drawing Sheets

ELECTRONIC APPARATUS

CROSS-REFERENCE TO RELATED APPLICATION

This application claims priority to Chinese Patent Application No. 202210118194.X, filed on Feb. 8, 2022, the entire content of which is incorporated herein by reference.

TECHNICAL FIELD

The present disclosure relates to the electronic apparatus technology field and, more particularly, to an electronic apparatus.

BACKGROUND

With the development of technology, virtual scene technology such as virtual reality is widely used. For example, a three-dimensional virtual scene may be used in a game or product presentation platform.

In different three-dimensional virtual scenes, the user often selects a certain virtual object. Some objects overlap with each other in the three-dimensional scene output by the electronic apparatus. Thus, the electronic apparatus considers that the object selected by the user is the object at the very front of a plurality of overlapped objects by default. Thus, the object determined by the electronic apparatus may not be the object that the user wants to select. Therefore, the virtual object cannot be selected accurately in these scenarios.

SUMMARY

Embodiments of the present disclosure provide an object determination method. The method includes outputting a virtual scene image of a virtual scene. The virtual scene image includes a stereoscopic virtual image of at least one virtual object in the virtual scene. The method further includes, based on a selection operation on the virtual object in the virtual scene image, determining an operation point coordinate of the selection operation in a display area. The display area is configured to display the virtual scene image. The method further includes determining a reference coordinate position in the virtual scene, determining a spatial coordinate of the operation point coordinate of the selection operation mapped into the virtual scene, and determining at least one candidate virtual object for a user to select from the virtual scene in connection with the reference coordinate position and the spatial coordinate.

Embodiments of the present disclosure provide an object determination device, including an image output unit, an operation point determination unit, a reference determination unit, a coordinate conversion unit, and a candidate determination unit. The image output unit is configured to output a virtual scene image of a virtual scene. The virtual scene image includes a stereoscopic virtual image of at least one virtual object in the virtual scene. The operation point determination unit is configured to, based on a selection operation on the virtual object in the virtual scene image, determine an operation point coordinate of the selection operation in a display area. The display area is configured to display the virtual scene image. The reference determination unit is configured to determine a reference coordinate position in the virtual scene. The coordinate conversion unit is configured to determine a spatial coordinate of the operation point coordinate of the selection operation mapped into the virtual scene. The candidate determination unit is configured to determine at least one candidate virtual object for a user to select from the virtual scene in connection with the reference coordinate position and the spatial coordinate.

Embodiments of the present disclosure provide an electronic apparatus, including a memory and a processor. The memory is coupled with the processor and stores a program that, when executed by the processor, causes the processor to output a virtual scene image of a virtual scene. The virtual scene image includes a stereoscopic virtual image of at least one virtual object in the virtual scene. The processor is further configured to, based on a selection operation on the virtual object in the virtual scene image, determine an operation point coordinate of the selection operation in a display area. The display area is configured to display the virtual scene image. The processor is further configured to determine a reference coordinate position in the virtual scene, determine a spatial coordinate of the operation point coordinate of the selection operation mapped into the virtual scene, and determine at least one candidate virtual object for a user to select from the virtual scene in connection with the reference coordinate position and the spatial coordinate.

The terms "first," "second," "third," "fourth," etc., (if any) in the description and claims and the above accompanying drawings are used to distinguish similar parts and not necessarily to describe specific order or sequence. Data described by using these terms are interchangeable under an appropriate situation. Thus, embodiments of the present disclosure described herein can be implemented in a sequence other than those illustrated here.

DETAILED DESCRIPTION OF THE EMBODIMENTS

The technical solution of the present disclosure is suitable in various virtual scenes, such as Virtual Reality (VR) and Augmented Reality (AR). According to the technical solution of the present disclosure, the accuracy and reliability of selecting a virtual object from a virtual scene by a user can be improved.

The technical solution of embodiments of the present disclosure can be described in detail below with reference to the accompanying drawings in embodiments of the present disclosure. Obviously, the described embodiments are only some embodiments of the present disclosure, but not all the embodiments. All other embodiments obtained by those of ordinary skill in the art without creative effort are also within the scope of the present disclosure.

Figure 1:
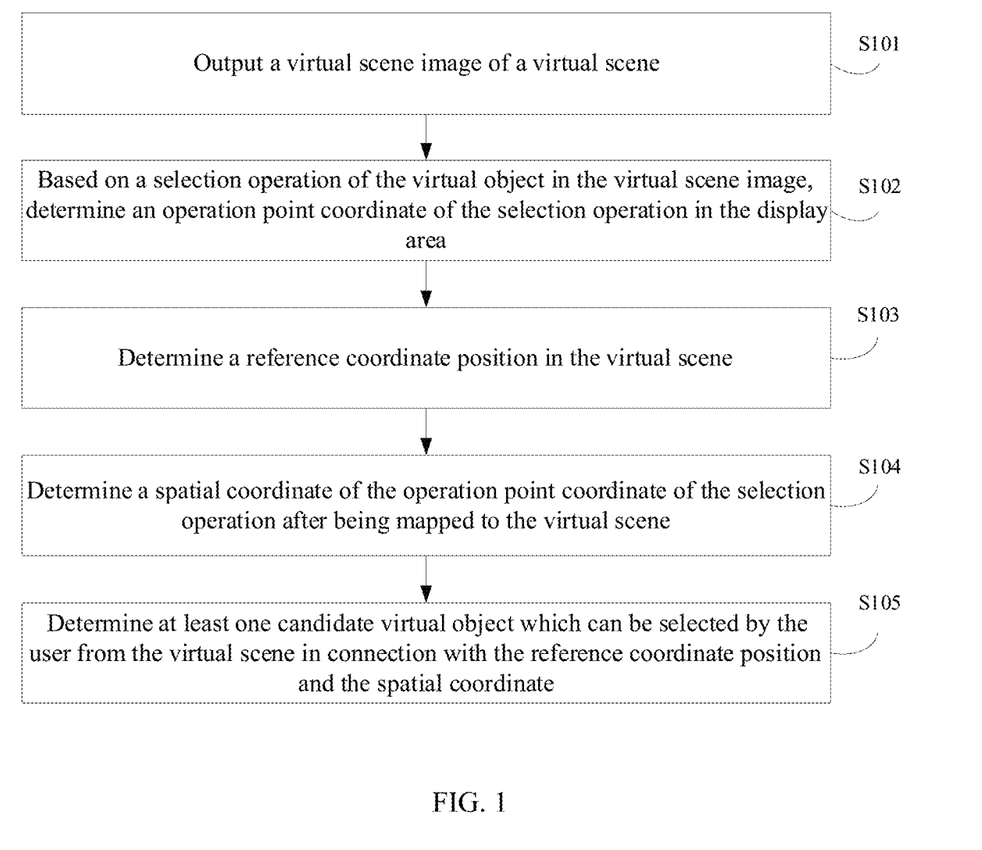
FIG. 1 illustrates a schematic flowchart of an object determination method according to some embodiments of the present disclosure.

FIG. 1 illustrates a schematic flowchart of an object determination method according to some embodiments of the present disclosure. The method of embodiments of the present disclosure can be applied to an electronic apparatus. The electronic apparatus can include a mobile phone, a laptop computer, a desktop computer, or a server. The method includes the following processes.

At S101, a virtual scene image of a virtual scene is outputted.

The virtual scene image can include a stereoscopic virtual image of at least one virtual object in the virtual scene.

The virtual scene can include a stereoscopic virtual scene, for example, a virtual scene such as VR or AR, and a virtual scene with another dimension or type, which is not limited by the present disclosure. Correspondingly, the stereoscopic virtual image can have different dimensions, for example, a 3-dimensional virtual image.

In the present disclosure, the virtual object can be a mapping of a physical object in the virtual scene. Thus, the stereoscopic virtual image of the virtual object can be a virtual image in which the physical object is mapped to the virtual scene. For example, the stereoscopic virtual image of the virtual object can be digital twin information of the physical object. That is, the stereoscopic virtual object can be the stereoscopic virtual image created for the physical object by using a digital twin technology.

The virtual object can also be any object that is constructed manually, such as a virtual character or a virtual article in a virtual gaming scene, etc., which is not limited by the present disclosure.

In some embodiments, the electronic apparatus can output a virtual scene image to a display screen of the electronic apparatus. For example, a laptop computer or a mobile phone can be used to output a virtual scene image to a display screen.

In some other embodiments, the electronic apparatus can also output or project the virtual scene image to a display area outside of the electronic apparatus.

At S102, based on a selection operation of the virtual object in the virtual scene image, an operation point coordinate of the selection operation is determined in the display area.

The display area can be configured to display the virtual scene image. For example, when the electronic apparatus outputs the virtual scene image to the display screen, the display area can be a display area of the display screen. For another example, when the electronic apparatus outputs the virtual scene image to a display area outside the display screen, the display area can be a display area in which the electronic apparatus controls to display the virtual scene image.

In the present disclosure, the display area can be a two-dimensional display area. Therefore, the coordinates of the operation point of the selection operation in the display area can be screen coordinates of the operation point of the selection operation in a screen coordinate system.

At S103, a reference coordinate position in the virtual scene is determined.

The reference coordinate position can be a current spatial coordinate of the reference point set in the virtual scene. The reference point can be a reference point used to select the virtual object.

The reference point can be a viewpoint position in the virtual scene. The viewpoint position can be a view angle position for observing the virtual scene. After the virtual scene image is outputted, the user can adjust a view angle of the virtual scene image. Thus, the viewpoint position can also be changed accordingly. Thus, the reference coordinate position can be also changed. Based on this, the reference coordinate position determined in process S103 can be the viewpoint position at the current time in the virtual scene, that is, the current reference coordinate position.

In some embodiments, a virtual camera (the virtual camera is not visible to the user) can be arranged in the virtual scene in the present disclosure. The position of the virtual camera can be simulated only to determine the viewpoint position. Correspondingly, in the present disclosure, a current camera position of the virtual camera can be determined in the virtual scene. The camera coordinate position can be the reference coordinate position.

At S104, a spatial coordinate of the operation point coordinate of the selection operation after being mapped to the virtual scene is determined.

The spatial coordinate of the operation point of the selection operation can be the spatial coordinate of the operation point mapped into a global coordinate system in the virtual scene from a screen coordinate system.

Various manners for determining the spatial coordinates of the operation point in the screen coordinate system in the virtual scene can be provided, which is not limited by the present disclosure.

To facilitate understanding, a process of mapping the operation point coordinate to the spatial coordinate in the virtual scene can be illustrated by taking an example.

For example, a camera coordinate system can be constructed in connection with the reference coordinate position. The operation point coordinate of the selection operation can be mapped from the screen coordinate system to a normalized apparatus coordinate. Then, the normalized apparatus coordinate can be mapped to a coordinate in the camera coordinate system. Then, the coordinate of the operation point of the selection operation in the camera coordinate system can be converted into the spatial coordinate in the global coordinate system of the virtual scene.

For example, a coordinate transformation process can include the following processes.

Firstly, according to a mapping relationship between the screen coordinate and the normalized apparatus coordinate, the operation point coordinate of the operation point of the selection operation in the screen coordinate system can be converted into the normalized apparatus coordinate in the normalized apparatus coordinate system.

For example, when the operation point coordinate (x1, y1) of the selection operation is known, the normalized device coordinate (x2, y2, z) can be obtained through conversion by the following formula:

$$x2=(x1/w)\times 2-1; \text{ and}$$

$$y2=-(y1/h)\times 2+1;$$

z can be 0.5.

w denotes a screen width. That is, a width of a display area configured to display the virtual scene image. For example, when the virtual scene image is displayed in the display screen, the screen width can be a display width of the display screen. When the virtual scene image such as the stereoscopic virtual image of the virtual object is projected at another type of display area through projection, the screen width can be the width of the display area configured to display the projected image. h denotes a screen height. Similarly, the screen height can be a display height of the display screen or a height of the display area.

Then, a first transformation matrix of transforming from the normalized apparatus coordinate system to the camera coordinate system can be determined. According to the first transformation matrix, the normalized apparatus coordinate corresponding to the selection operation can be transformed into the coordinate in the camera coordinate system.

Then, a second transformation matrix of transforming from the camera coordinate system to the global coordinate system of the virtual scene can be determined. The coordinate in the camera coordinate system can be transformed into a spatial coordinate in the global coordinate system based on the second transformation matrix.

The above description is only a manner of converting the operation point coordinate into the spatial coordinate in the global coordinate system. Another manner can also be applied to the present disclosure.

At S105, at least one candidate virtual object which can be selected by the user is determined from the virtual scene in connection with the reference coordinate position and the spatial coordinate.

For example, the reference coordinate position can be used as a viewpoint position (i.e., a viewing angle) to determine candidate virtual objects in the virtual scene that can belong to the spatial coordinate. The determined candidate virtual objects can be determined as candidate virtual objects for the user to select.

Different from the existing manner of directly determining the virtual object selected by the user only in connection with the operation point coordinate of the selection operation in the display area, in the present disclosure, the operation point coordinate can be converted into the spatial coordinate, all candidate virtual objects selected by the selection operation corresponding to the spatial coordinate can be determined from the virtual objects for the user to select. Thus, a selection range for the user to select the candidate virtual object can be increased. Thus, overlapped virtual objects viewed from the display area can be used as the candidate virtual objects for the user to select, which improves the accuracy and reliability of selecting the virtual object by the user.

In some embodiments, after the at least one candidate virtual object is determined, in the present disclosure, information of the at least one candidate virtual object can be outputted to the display area. The information of the candidate virtual object can include one or more pieces of information such as the name, the position, and the introduction of the candidate virtual object. Based on this, the user can determine the virtual object that the user really wants to select according to the information of the at least one candidate virtual object. Correspondingly, the virtual object selected by the user can be determined based on the selection operation of the user on the information of the at least one candidate virtual object.

In some other embodiments, after the at least one candidate virtual object is determined, a display effect of the candidate virtual object can be adjusted from a first display effect to a second display effect in the present disclosure. The second display effect can be different from the first display effect. Thus, the candidate virtual objects and other virtual objects in the virtual scene that are not used as the candidate virtual objects can be displayed differently.

The second display effect can be different from the first display effect in terms of color of the virtual object, a dynamic effect, or a scaling ratio of the virtual object.

For example, the scaling ratio of a size of a virtual object in the virtual scene can be fixed. To make the user select the candidate virtual object more conveniently, the scaling ratio of the candidate virtual object can be increased to cause the candidate virtual object of the second display effect to be larger than the candidate virtual object of the first display effect. Thus, the user can conveniently click and select the candidate virtual object.

Correspondingly, the virtual object selected by the user can be determined in connection with the selection operation of the user on the candidate virtual object of the second display effect.

In the present disclosure, after the virtual scene image is outputted, an operation point operation of the selection operation in the display area can be determined based on the selection operation of the virtual object in the virtual scene image, and the spatial coordinate of the operation point coordinate mapped to the virtual scene can be determined. Based on this, in connection with the reference coordinate position in the virtual scene and the spatial coordinate corresponding to the selection operation, the at least one candidate virtual object that can be selected through the selection operation can be determined from the virtual object for the user to select. Thus, an object at the top of the virtual scene image can be determined as the selection object in connection with the selection operation. Therefore, the user can select the desired virtual object more appropriately, which improves the accuracy and reliability of selecting the virtual object.

The method for determining the object of the present disclosure is described by taking an example of determining the virtual object.

Figure 2:
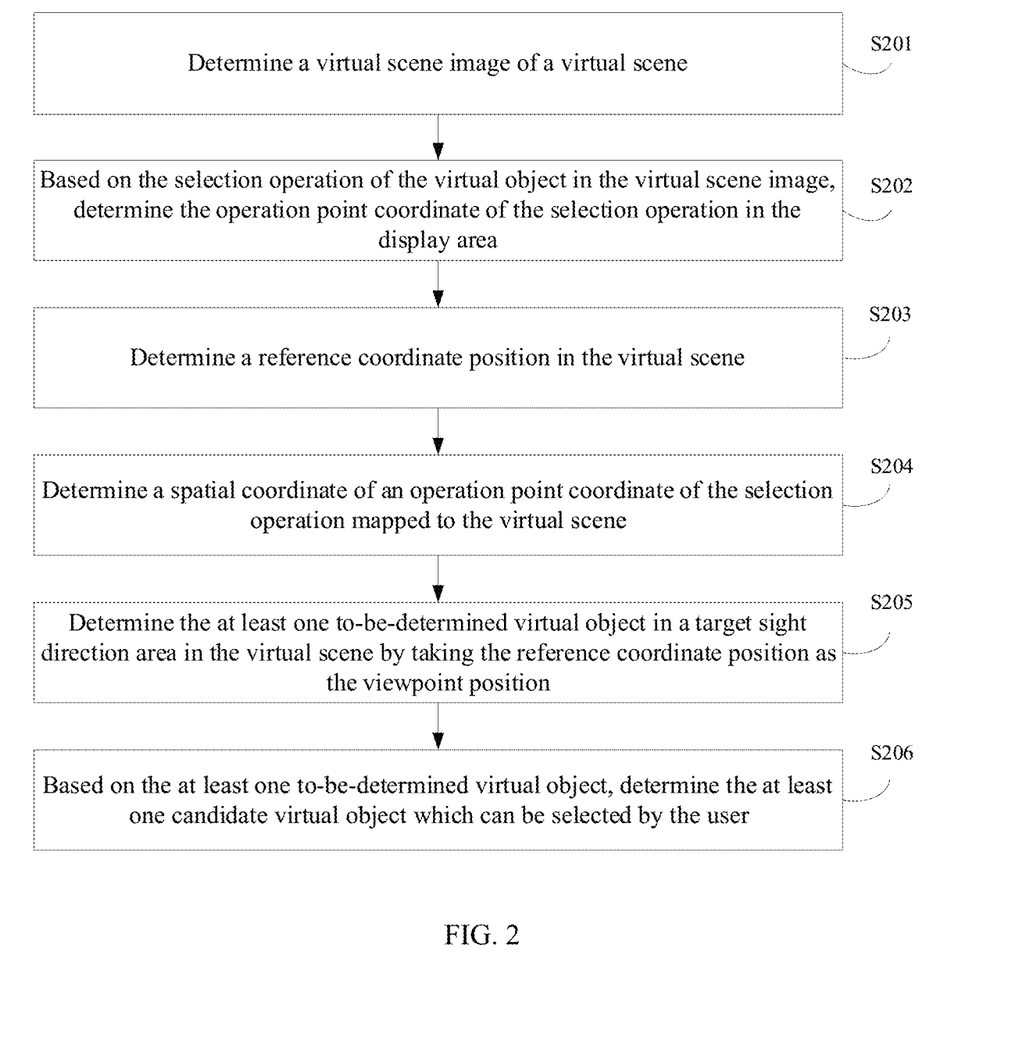
FIG. 2 illustrates a schematic flowchart of another object determination method according to some embodiments of the present disclosure.

FIG. 2 illustrates a schematic flowchart of another object determination method according to some embodiments of the present disclosure. The method of the present disclosure can be applied to an electronic apparatus. The method of the present embodiment includes the following processes.

At S201, a virtual scene image of a virtual scene is outputted.

The virtual scene image can include a stereoscopic virtual image of at least one virtual object in the virtual scene.

At S202, based on the selection operation of the virtual object in the virtual scene image, the operation point coordinate of the selection operation in the display area is determined.

The display area can be configured to display the virtual scene image.

At S203, a reference coordinate position is determined in the virtual scene.

At S204, a spatial coordinate of an operation point coordinate of the selection operation mapped to the virtual scene is determined.

For description of processes S201 to S204, references can be made to the above description, which is not repeated here.

At S205, the at least one to-be-determined virtual object is determined in a target sight direction area in the virtual scene by taking the reference coordinate position as the viewpoint position.

The viewpoint position can be a view angle position of viewing the virtual image.

The target sight direction area can be a direction area including a sight direction from the viewpoint position to the spatial coordinate corresponding to the selection operation.

The sight direction from the viewpoint position to the spatial coordinate can be a direction where a ray from the viewpoint position through the spatial coordinate is located.

In some embodiments, the target sight direction area can be a sight direction from the viewpoint position to the spatial coordinate.

Since the viewpoint position can also be regarded as the user view angle position, if the virtual object is in the sight direction from the viewpoint position to the spatial coordinate, from a user perspective, virtual objects in the sight direction can be all virtual objects in the sight direction of the user, that is, the virtual objects that can be selected by the user through the selection operation. Therefore, the virtual objects in the sight direction can be used as to-be-determined virtual objects that the user can select.

Figure 3:
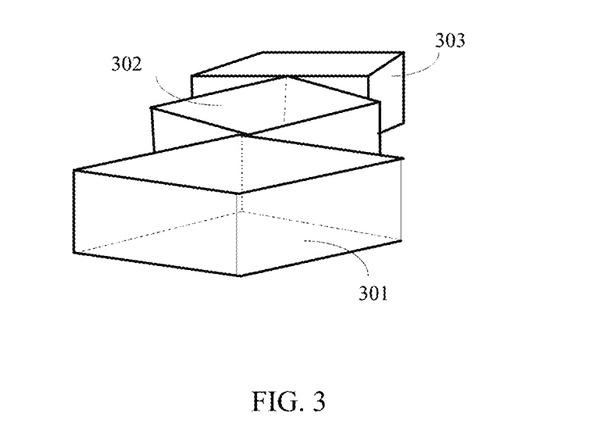
FIG. 3 illustrates a schematic diagram showing a virtual scene image displayed in a display according to some embodiments of the present disclosure.

For example, FIG. 3 illustrates a schematic diagram showing a virtual scene image displayed in a display according to some embodiments of the present disclosure.

As shown in FIG. 3, three virtual objects are in the virtual scene image, that is three virtual cubes such as cube 301, cube 302, and cube 303.

However, after the virtual scene image is mapped from a multi-dimensional virtual scene to a two-dimensional display screen, the three cubes can overlap. Thus, according to the current method of selecting the virtual object, cube 302 and cube 303 may not be selected. Cube 301 can only be selected by default through the user.

In the technical solution of the present disclosure, if the user inputs a selection operation in front of cube 301, the three cubes can all be used as the to-be-determined virtual objects. For the principle, references can be made to FIG. 4.

Figure 4:
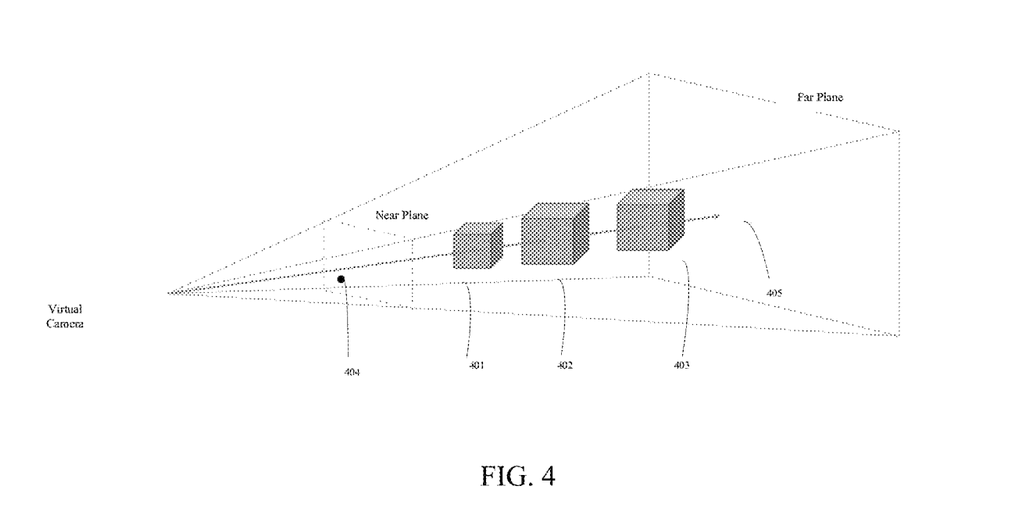
FIG. 4 illustrates a schematic diagram showing a principle of determining a to-be-determined virtual object in a sight direction according to some embodiments of the present disclosure.

In FIG. 4, for example, the reference coordinate position in the virtual scene is taken as the camera position of the virtual camera.

FIG. 4 shows stereoscopic virtual images of the three cubes of FIG. 3 in the global coordinate system of the virtual scene. That is, 3-dimensional cube 401 corresponding to cube 301 is displayed on the display screen. Similarly, cube 402 corresponds to cube 302 of FIG. 3, and cube 403 corresponds to cube 303 of FIG. 3.

In the present disclosure, if the user inputs the selection operation in front of cube 301 in the display screen shown in FIG. 3 after the selection operation is mapped to the global coordinate system of the virtual scene, the spatial coordinate is shown by point 404 in FIG. 4.

Thus, cube 401, cube 402, and cube 403 can be in the sight direction from the position of the virtual camera to the spatial coordinate 404. The sight direction is shown as ray 405 in FIG. 4. Therefore, cube 401, cube 402, and cube 403 can be used as the to-be-determined virtual objects that the user may wish to select in the present disclosure.

In some other embodiments, the target fight direction area can be a direction area extending in the sight direction from the viewpoint position to the spatial coordinate.

For example, after the sight direction from the viewpoint position to the spatial coordinate is determined, a plurality of rays that start from the viewpoint position and have an angle with the sight direction smaller than a predetermined angle value can be constructed. The plurality of rays can form a cone direction area around the sight direction. The cone direction area can be used as the target sight direction area.

The sight direction can also be extended in connection with the viewpoint position in another manner to construct a target sight direction area, which is not limited by the present disclosure.

The spatial coordinate converted from the operation point coordinate of the selection operation input by the user can be deviated from the spatial point that the user actually wants to click in the virtual space. In some other embodiments, in the virtual scene, some virtual objects can be associated with each other. When the user clicks a certain virtual object, the user may want to select a virtual object close to and associated with the certain virtual object or select a plurality of virtual objects simultaneously. In the above situations, if only the virtual objects in the sight direction from the viewpoint position to the spatial coordinate corresponding to the selection operation are determined to be the to-be-determined virtual objects, some virtual objects that the user wants to select may be omitted.

For example, a virtual laptop computer and a computer bag can be placed on a display stand of the virtual scene simultaneously. The two items are close to each other. If the operation point of the user selection operation slightly deviates, the determined sight direction can only pass through one of the virtual laptop computer and the computer bag. However, the object based on the sight direction may not be the item that the user wants to select, or the user may want to select both the virtual laptop computer and the computer bag. Thus, when only the virtual objects in the sight direction are used as the to-be-determined virtual objects, the to-be-determined virtual objects may not include the virtual object that the user wants to select.

A target sight direction area can be obtained by extending the sight direction from the viewpoint position to the spatial coordinate. Thus, the virtual objects that can be selected by the user can be better covered. The to-be-determined virtual objects that can be selected by the user and better reflect the selection requirements can be provided for the user.

At S206, based on the at least one to-be-determined virtual object, the at least one candidate virtual object which can be selected by the user is determined.

A plurality of manners of determining the candidate virtual object based on the to-be-determined virtual objects can be provided.

For example, in some embodiments, in the present disclosure, the at least one to-be-determined virtual object can be used as the candidate virtual object, which may reduce the omission of the virtual object that the user wants to select.

In some other embodiments, in the present disclosure, distances between the to-be-determined virtual objects and the reference coordinate position can be determined. Based on this, a to-be-determined virtual object having a distance to the reference coordinate position smaller than a predetermined threshold can be determined as the candidate virtual object. Thus, the at least one candidate virtual object can be obtained.

The distances between the to-be-determined virtual objects and the reference coordinate can be obtained in a plurality of manners. A distance from a center line point of the to-be-determined virtual object to the reference coordinate position can be calculated.

In some other embodiments, when the target sight direction area is a sight direction from the reference coordinate position to the spatial coordinate of the selection operation, by using the reference coordinate position as a starting point, the at least one to-be-determined object passed by a ray from the starting point through the spatial coordinate can be determined. Thus, at least one intersection point between the ray and the to-be-determined object is determined, and a distance between the intersection point and the starting point can be determined.

For example, only the distance between the first intersection point of the to-be-determined virtual object and the ray and the starting point can be determined. The distance can be used as the distance between the to-be-determined virtual object and the reference coordinate position.

In some other embodiments, in the present disclosure, based on the attribute feature of the to-be-determined virtual object, an associated virtual object associated with the to-be-determined virtual object can be determined in the virtual scene. The at least one candidate virtual object for the user to select can be determined by combining the at least one to-be-determined virtual object and the associated virtual object associated with the to-be-determined virtual object.

The attribute feature of the to-be-determined virtual object can include information such as a category, a name, a usage, and an owner of the to-be-determined virtual object, which is not limited here.

Correspondingly, the to-be-determined virtual object having the associated virtual object can refer to that the virtual object associated with the attribute feature of the to-be-determined virtual object. For example, the virtual object can belong to a same category as the to-be-determined virtual object, or can be used in association with the to-be-determined virtual object.

The candidate virtual object can be determined comprehensively by combining the to-be-determined virtual object and the associated virtual object associated with the to-be-determined virtual object, which is beneficial to more comprehensively determining the virtual object that the user may want to select.

For example, the to-be-determined virtual object and the associated virtual object associated with the to-be-determined virtual object can be used as the candidate virtual objects. In connection with the distance between the to-be-determined virtual object and the reference coordinate position, the to-be-determined virtual object and the associated virtual object associated therewith having the distance smaller than the distance threshold can be determined as the candidate virtual objects.

To facilitate understanding of the technical solution of the present disclosure, another manner can be described by taking the virtual scene as a 3-dimensional virtual scene.

Figure 5:
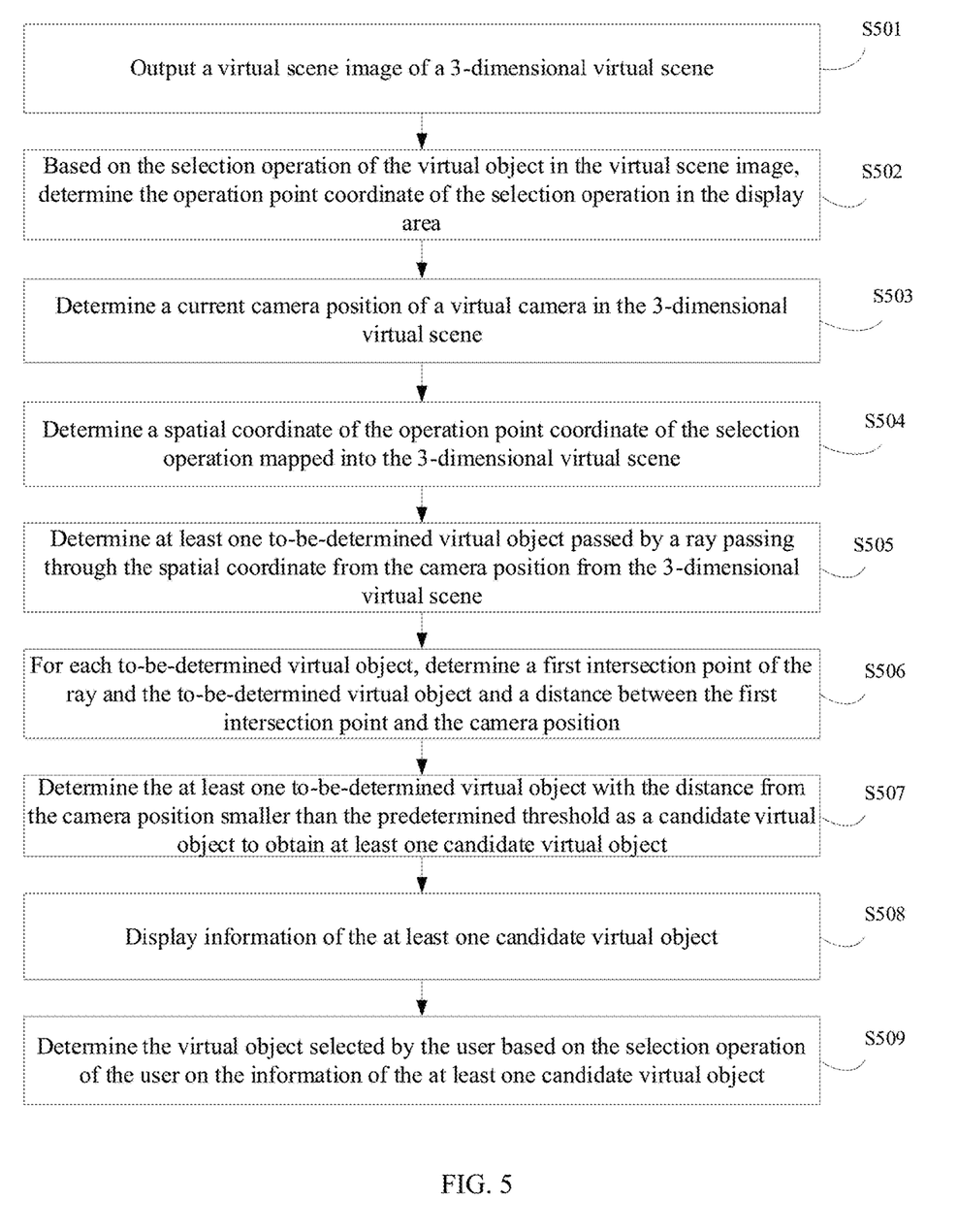
FIG. 5 illustrates a schematic flowchart of another object determination method according to some embodiments of the present disclosure.

FIG. 5 illustrates a schematic flowchart of another object determination method according to some embodiments of the present disclosure. The method of the present disclosure can be applied to an electronic apparatus. The method of the present disclosure includes the following processes.

At S501, a virtual scene image of a 3-dimensional virtual scene is outputted.

The virtual scene image can include a 3-dimensional virtual image of at least one virtual object in the 3-dimensional virtual scene.

At S502, based on the selection operation of the virtual object in the virtual scene image, the operation point coordinate of the selection operation is determined in the display area.

The display area can be configured to display the virtual scene image.

At S503, a current camera position of a virtual camera is determined in the 3-dimensional virtual scene.

At S504, a spatial coordinate of the operation point coordinate of the selection operation mapped into the 3-dimensional virtual scene is determined.

For description of processes S201 to S204, references can be made to the description above, which is not repeated here.

At S505, at least one to-be-determined virtual object passed by a ray passing through the spatial coordinate from the camera position is determined from the 3-dimensional virtual scene.

At S506, for each to-be-determined virtual object, a first intersection point of the ray and the to-be-determined virtual object and a distance between the first intersection point and the camera position are determined.

The ray represents a sight direction from the camera position to the spatial coordinate of the selection operation. When a distance between the sight direction and the first intersection point of the to-be-determined virtual object is closer to the camera position, the probability that the user selects the to-be-determined virtual object is higher in the perspective of the sight direction. Thus, by determining the distance in connection with the above manner, the virtual object that the user wants to select can be more accurately determined subsequently.

At S507, the at least one to-be-determined virtual object with the distance from the camera position smaller than the predetermined threshold is determined as a candidate virtual object to obtain at least one candidate virtual object.

In practical applications, in addition to determining the intersection point of the ray and the to-be-determined virtual object, an intersection plane of the ray and the to-be-determined virtual object can also be determined. Based on this, the candidate virtual object can be determined subsequently in connection with the distance between the intersection point and the camera position and the intersection plane between the to-be-determined virtual object and the ray.

At S508, information of the at least one candidate virtual object is displayed.

At S509, the virtual object selected by the user is determined based on the selection operation of the user on the information of the at least one candidate virtual object.

The present disclosure also provides an object-determination device corresponding to the object-determination method.

Figure 6:
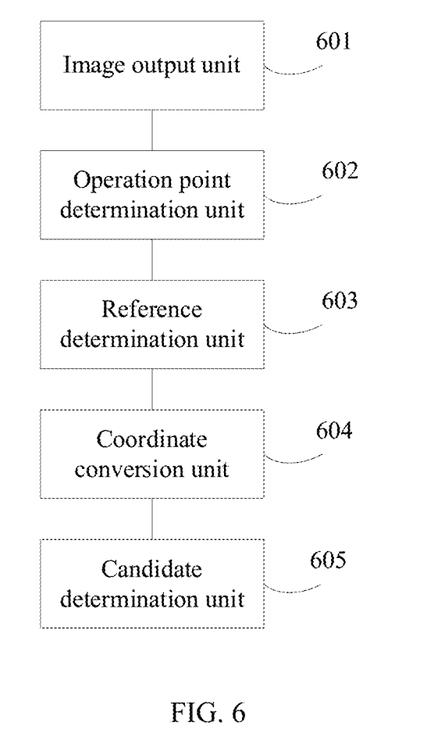
FIG. 6 illustrates a schematic structural diagram of an object determination device according to some embodiments of the present disclosure.

FIG. 6 illustrates a schematic structural diagram of an object determination device according to embodiments of the present disclosure. The device can be applied to the above electronic apparatus.

The device includes an image output unit 601, an operation point determination unit 602, a reference determination unit 603, a coordinate conversion unit 604, and a candidate determination unit 605.

The image output unit 601 can be configured to output a virtual scene image of a virtual scene. The virtual scene image can include a stereoscopic virtual image of at least one virtual object in the virtual scene.

The operation point determination unit 602 can be configured to determine, based on a selection operation on the virtual object in the virtual scene image, an operation point coordinate of the selection operation in a display area. The display area can be configured to display the virtual scene image.

The reference determination unit 603 can be configured to determine a reference coordinate position in the virtual scene.

The coordinate conversion unit 604 can be configured to determine a spatial coordinate of the operation point of the selection operation mapped into the virtual scene.

The candidate determining unit 605 can be configured to determine, from the virtual scene, at least one candidate virtual object for the user to select in connection with the reference coordinate position and the spatial coordinate.

In some embodiments, the candidate determination unit can include a to-be-determination unit and an object determination unit.

The to-be-determination unit can be configured to determine, from the virtual scene, at least one to-be-determined virtual object in a target sight direction area with the reference coordinate position as the viewpoint position. The target sight direction area can include a direction area including the sight directions from the viewpoint position to the spatial coordinate.

The object determination unit can be configured to determine, based on the at least one to-be-determined virtual object, the at least one candidate virtual object for the user to select.

In some embodiments, the device can further include a distance determination unit.

The distance determination unit can be configured to determine a distance between the to-be-determined virtual object and the reference coordinate position before the candidate determination unit determines the at least one candidate virtual object for the user to select.

The object determination unit can include a first object determination sub-unit.

The first object determination sub-unit can be configured to determine the at least one candidate virtual object from the at least one to-be-determined virtual object with the distance smaller than the predetermined distance threshold.

In some embodiments, the to-be-determination unit can include a to-be-determination sub-unit.

The to-be-determination sub-unit can be configured to determine, with the reference coordinate position as a starting point, the at least one to-be-determined virtual object passed through by a ray through the spatial coordinate from the starting point from the virtual scene.

The distance determination unit can include a distance determination sub-unit.

The distance determination sub-unit can be configured to determine at least one intersection point of the ray and the to-be-determined virtual object and the distance between the intersection point and the starting point.

In some embodiments, the object determination unit can include an association determination sub-unit and a second object determination unit.

The association determination sub-unit can be configured to determine, based on the attribute feature of the to-be-determined virtual object, the associated virtual object associated with the to-be-determined virtual object from the virtual scene.

The second object determination sub-unit can be configured to determine the at least one candidate virtual object for the user to select in connection with the at least one to-be-determined virtual object and the associated virtual object associated with the to-be-determined virtual object.

In some embodiments, the reference determination unit can include a reference determination sub-unit.

The reference determination sub-unit can be configured to determine the current camera coordinate position of the virtual camera in the virtual scene.

In some embodiments, the device can further include a candidate display unit and a first selection determination unit.

The candidate display unit can be configured to display information of the at least one candidate virtual object.

The first selection confirmation unit can be configured to determine the virtual object selected by the user based on the selection operation of the user on the information of the at least one candidate virtual object.

In some embodiments, the device can further include an effect adjustment unit and a second selection determination unit.

The effect adjustment unit can be configured to adjust a display effect of the candidate virtual object from the first display effect to the second display effect. The second display effect can be different from the first display effect.

The second selection determination unit can be configured to determine the virtual object selected by the user in connection with the selection operation of the user on the candidate virtual object with the second display effect.

Figure 7:
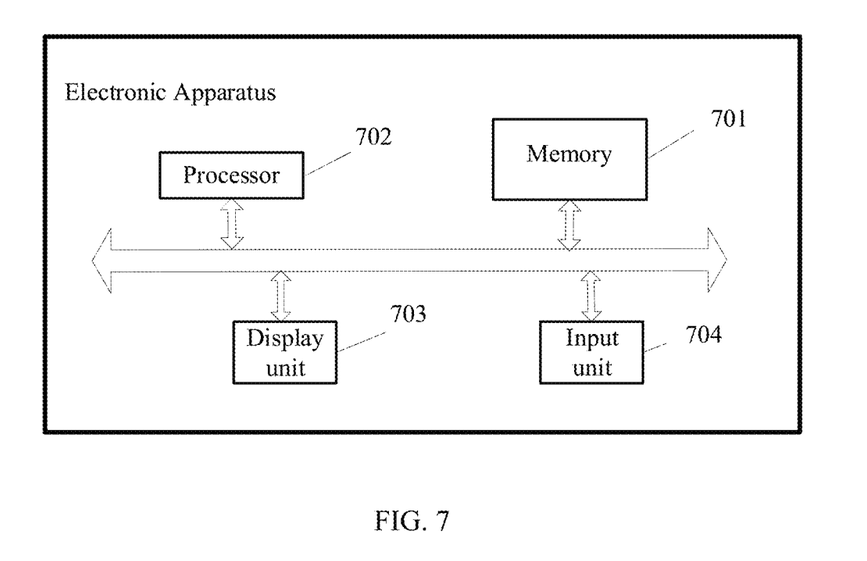
FIG. 7 illustrates a schematic architectural diagram of an electronic apparatus according to some embodiments of the present disclosure.

In another aspect, the present disclosure further provides an electronic apparatus. FIG. 7 illustrates a schematic architectural diagram of an electronic apparatus according to embodiments of the present disclosure. The electronic apparatus includes at least a memory 701 and a processor 702.

The processor 701 can be configured to perform any of the object determination methods of embodiments of the present disclosure.

The memory 702 can be used to store programs needed for the processor to perform the operation.

The electronic apparatus can further include a display unit 703 and an input unit 704.

The electronic apparatus can have more or less components than those shown in FIG. 7, which is not limited by the present disclosure.

In another aspect, the present disclosure further provides a computer-readable storage medium. The computer-readable storage medium can store at least one instruction, at least one section of a program, a set of codes, or a set of instructions. The at least one instruction, the at least one section of the program, the set of codes, or the set of instructions can be loaded and executed by the processor to implement any of the object determination methods of embodiments of the present disclosure.

The present disclosure also provides a computer program. The computer program can include computer instructions. The computer instructions can be stored in a computer-readable storage medium. When the computer program is running on the electronic apparatus, the object determination methods of embodiments of the present disclosure can be performed.

In the present disclosure, embodiments are described in a progressive manner, each embodiment focuses on differences from other embodiments. The same and similar parts among embodiments of the present disclosure can be referred to each other. Meanwhile, the features described in embodiments of the present disclosure can be replaced or combined with each other. Thus, those skilled in the art can implement or use the present disclosure. Since device embodiments are basically similar to method embodiments, the description is simple. For the relevant parts, reference can be made to a part of the description of method embodiments.

In the present disclosure, relational terms such as first and second are used only to distinguish one entity or operation from another entity or operation without necessarily requiring or implying any actual such relationship or order between these entities or operations. Moreover, the terms "comprising," "including," or any other variation thereof, are intended to cover a non-exclusive inclusion. Thus, a process, method, article, or apparatus that includes a list of elements does not include only those elements but can include other elements not expressly listed or inherent to such process, method, article, or apparatus. Without further limitation, an element defined by the phrase "comprising an . . . " does not exclude the presence of another identical element in a process, method, article, or apparatus that includes the element.

The description of embodiments of the present disclosure is provided to enable those skilled in the art to implement or use the present disclosure. Various modifications to these embodiments can be apparent to those skilled in the art. The generic principle defined here can be applied to other embodiments without departing from the spirit or scope of the present disclosure. Thus, the present disclosure is limited to embodiments shown here but conforms to the widest scope consistent with the principles and novel features of the present disclosure.

What is claimed is:

1. A method for object determination, comprising:
   outputting a virtual scene image of a virtual scene, the virtual scene image including a stereoscopic virtual image of at least one virtual object in the virtual scene;
   based on a selection operation on the virtual object in the virtual scene image, determining an operation point coordinate of the selection operation in a display area, the display area being configured to display the virtual scene image;
   determining a reference coordinate position in the virtual scene;
   determining a spatial coordinate of the operation point coordinate of the selection operation mapped into the virtual scene;
   determining at least one to-be-determined virtual object in a target sight direction area from the virtual scene by using the reference coordinate position as a viewpoint position, the target sight direction area being a direction area including a sight direction from the viewpoint position to the spatial coordinate;
   determining an associated virtual object associated with the at least one to-be-determined virtual object from the virtual scene based on an attribute feature of the at least one to-be-determined virtual object; and
   determining at least one candidate virtual object for the user to select from the virtual scene in connection with the at least one to-be-determined virtual object and the associated virtual object associated with the at least one to-be-determined virtual object, the at least one candidate virtual object comprising the associated virtual object and one or more of the at least one to-be-determined virtual object.

2. The method of claim 1, further comprising, before determining the at least one candidate virtual object for the user to select:
   determining a distance between the at least one to-be-determined object and the reference coordinate position;
   wherein determining the at least one candidate virtual object for the user to select based on the at least one to-be-determined virtual object includes:
      determining the at least one candidate virtual object with the distance smaller than a predetermined distance threshold from the at least one to-be-determined virtual object.

3. The method of claim 2, wherein:
   determining the at least one candidate virtual object in the target sight direction area from the virtual scene by using the reference coordinate position as the viewpoint position includes:
      using the reference coordinate position as a starting point, and determining the at least one to-be-determined virtual object passed by a ray from the starting point through the spatial coordinate from the virtual scene; and
   determining a distance between the at least one to-be-determined virtual object and the reference coordinate position includes:
      determining at least one intersection point between the ray and the at least one to-be-determined virtual object and a distance between the intersection point and the starting point.

4. The method of claim 1, wherein determining the reference coordinate position in the virtual scene includes:
   determining a current camera coordinate position of a virtual camera in the virtual scene.

5. The method of claim 1, further comprising:
   displaying information of the at least one candidate virtual object; and
   determining a virtual object selected by the user based on the selection operation of the user on the information of the at least one candidate virtual object.

6. The method of claim 1, further comprising:
   adjusting a display effect of the candidate virtual object from a first display effect to a second display effect, the second display effect being different from the first display effect; and
   determining a virtual object selected by the user in connection with the selection operation of the user on the candidate virtual object with the second display effect.

7. A device for object determination, comprising:
   an image output unit configured to output a virtual scene image of a virtual scene, the virtual scene image including a stereoscopic virtual image of at least one virtual object in the virtual scene;
   an operation point determination unit configured to, based on a selection operation on the virtual object in the virtual scene image, determine an operation point coordinate of the selection operation in a display area, the display area being configured to display the virtual scene image;
   a reference determination unit configured to determine a reference coordinate position in the virtual scene;
   a coordinate conversion unit configured to determine a spatial coordinate of the operation point coordinate of the selection operation mapped into the virtual scene; and
   a candidate determination unit configured to:
      determine at least one to-be-determined virtual object in a target sight direction area from the virtual scene by using the reference coordinate position as a viewpoint position, the target sight direction area being a direction area including a sight direction from the viewpoint position to the spatial coordinate;
      determine an associated virtual object associated with the at least one to-be-determined virtual object from the virtual scene based on an attribute feature of the at least one to-be-determined virtual object; and
      determine at least one candidate virtual object for the user to select from the virtual scene in connection with the at least one to-be-determined virtual object and the associated virtual object associated with the at least one to-be-determined virtual object, the at least one candidate virtual object comprising the associated virtual object and one or more of the at least one to-be-determined virtual object.

8. The device of claim 7, further comprising:
a distance determination unit configured to determine a distance between the at least one to-be-determined object and the reference coordinate position;
wherein the candidate determination unit is further configured to:
determine the at least one candidate virtual object with the distance smaller than a predetermined distance threshold from the at least one to-be-determined virtual object.

9. The device of claim 8, wherein the candidate determination unit is further configured to:
use the reference coordinate position as a starting point, and determine the at least one to-be-determined virtual object passed by a ray from the starting point through the spatial coordinate from the virtual scene; and
determine at least one intersection point between the ray and the at least one to-be-determined virtual object and a distance between the intersection point and the starting point.

10. An electronic apparatus comprising:
a processor; and
a memory coupled with the processor and storing a program that, when executed by the processor, causes the processor to:
output a virtual scene image of a virtual scene, the virtual scene image including a stereoscopic virtual image of at least one virtual object in the virtual scene;
based on a selection operation on the virtual object in the virtual scene image, determine an operation point coordinate of the selection operation in a display area, the display area being configured to display the virtual scene image;
determine a reference coordinate position in the virtual scene;
determine a spatial coordinate of the operation point coordinate of the selection operation mapped into the virtual scene;
determine at least one to-be-determined virtual object in a target sight direction area from the virtual scene by using the reference coordinate position as a viewpoint position, the target sight direction area being a direction area including a sight direction from the viewpoint position to the spatial coordinate;
determine an associated virtual object associated with the at least one to-be-determined virtual object from the virtual scene based on an attribute feature of the at least one to-be-determined virtual object; and
determine at least one candidate virtual object for the user to select from the virtual scene in connection with the at least one to-be-determined virtual object and the associated virtual object associated with the at least one to-be-determined virtual object, the at least one candidate virtual object comprising the associated virtual object and one or more of the at least one to-be-determined virtual object.

11. The apparatus of claim 10, wherein the processor is further configured to:
determine a distance between the at least one to-be-determined object and the reference coordinate position; and
determine the at least one candidate virtual object with the distance smaller than a predetermined distance threshold from the at least one to-be-determined virtual object.

12. The apparatus of claim 11, wherein the processor is further configured to:
use the reference coordinate position as a starting point, and determine the at least one to-be-determined virtual object passed by a ray from the starting point through the spatial coordinate from the virtual scene; and
determine at least one intersection point between the ray and the at least one to-be-determined virtual object and a distance between the intersection point and the starting point.

13. The apparatus of claim 10, wherein the processor is further configured to:
determine a current camera coordinate position of a virtual camera in the virtual scene.

14. The apparatus of claim 10, wherein the processor is further configured to:
display information of the at least one candidate virtual object; and
determine a virtual object selected by the user based on the selection operation of the user on the information of the at least one candidate virtual object.

15. The apparatus of claim 10, wherein the processor is further configured to:
adjust a display effect of the candidate virtual object from a first display effect to a second display effect, the second display effect being different from the first display effect; and
determine a virtual object selected by the user in connection with the selection operation of the user on the candidate virtual object with the second display effect.

* * * * *